US010816153B2

(12) United States Patent
Song

(10) Patent No.: US 10,816,153 B2
(45) Date of Patent: Oct. 27, 2020

(54) WIRELESS LIGHTING CONTROL SYSTEM

(71) Applicant: FANLIGHT CO., LTD., Uiwang-si, Gyeonggi-do (KR)

(72) Inventor: Ho Lim Song, Seoul (KR)

(73) Assignee: FANLIGHT CO., LTD., Uiwang-si (KR)

( * ) Notice: Subject to any disclaimer, the term of this patent is extended or adjusted under 35 U.S.C. 154(b) by 0 days.

(21) Appl. No.: 15/828,730

(22) Filed: Dec. 1, 2017

(65) Prior Publication Data

US 2018/0080618 A1  Mar. 22, 2018

Related U.S. Application Data

(63) Continuation of application No. PCT/KR2016/006444, filed on Jun. 17, 2016.

(30) Foreign Application Priority Data

Jun. 18, 2015 (KR) .......................... 10-2015-0086748

(51) Int. Cl.
*F21S 10/02* (2006.01)
*H04W 4/33* (2018.01)
(Continued)

(52) U.S. Cl.
CPC .......... *F21S 10/02* (2013.01); *F21V 23/0435* (2013.01); *G06F 15/173* (2013.01); *H04W 4/33* (2018.02);
(Continued)

(58) Field of Classification Search
CPC .... H05B 37/02; H05B 37/0254; H05B 47/10; H05B 47/18; H05B 47/19; F21S 10/02;
(Continued)

(56) References Cited

U.S. PATENT DOCUMENTS 6,211,626 B1 *  4/2001  Lys ...................... A61N 5/0616
                                                        315/291
7,697,925 B1 *  4/2010  Wilson .................... H04M 1/22
                                                        455/418
(Continued)

FOREIGN PATENT DOCUMENTS

JP  2005-318148 A  11/2005
JP  2009-187951 A   8/2009
(Continued)

OTHER PUBLICATIONS

International Search Report issued in PCT/KR2016/006444; dated Sep. 20, 2016.
(Continued)

*Primary Examiner* — Alexander H Taningco
*Assistant Examiner* — Pedro C Fernandez
(74) *Attorney, Agent, or Firm* — Studebaker & Brackett PC

(57) ABSTRACT

A wireless lighting control system is provided to create a lighting pattern by remotely controlling a plurality of lighting devices, thereby improving a lighting effect. The wireless lighting control system includes a first smart device to receive information necessary for generating a lighting control signal, a first lighting device electrically connected with the first smart device through to wirelessly transmit the lighting control signal, a second lighting device to receive the lighting control signal from the first lighting device to control a lighting unit based on the received lighting control signal, and a second smart device electrically connected with the second lighting device to control a display unit based on the lighting control signal.

7 Claims, 5 Drawing Sheets

(51) Int. Cl.
  *F21V 23/04*  (2006.01)
  *H04W 4/70*  (2018.01)
  *H05B 47/10*  (2020.01)
  *H05B 47/18*  (2020.01)
  *H05B 47/19*  (2020.01)
  *G06F 15/173*  (2006.01)
  *F21W 131/107*  (2006.01)

(52) U.S. Cl.
  CPC .............. *H04W 4/70* (2018.02); *H05B 47/10* (2020.01); *H05B 47/18* (2020.01); *H05B 47/19* (2020.01); *F21W 2131/107* (2013.01); Y02B 20/40 (2013.01)

(58) Field of Classification Search
  CPC ....... H04W 4/33; H04W 4/70; F21V 23/0435; G06F 15/173
  See application file for complete search history.

(56) References Cited

U.S. PATENT DOCUMENTS

| | | | | |
|---|---|---|---|---|
| 2009/0105856 | A1* | 4/2009 | Kurt | H05B 37/0254 700/90 |
| 2012/0034934 | A1* | 2/2012 | Loveland | H04W 4/026 455/456.3 |
| 2014/0246991 | A1* | 9/2014 | Kim | H05B 37/0227 315/292 |
| 2015/0264091 | A1* | 9/2015 | Lin | H04L 67/12 709/228 |
| 2015/0382144 | A1* | 12/2015 | Lopez | H04W 4/023 455/456.2 |
| 2016/0165659 | A1* | 6/2016 | Deng | H04L 12/28 315/292 |
| 2016/0227632 | A1* | 8/2016 | Zhang | H05B 33/0845 |

FOREIGN PATENT DOCUMENTS

| | | |
|---|---|---|
| JP | 2011-029053 A | 2/2011 |
| JP | 2012-146536 A | 8/2012 |
| JP | 2013-191357 A | 9/2013 |
| JP | 2015-041438 A | 3/2015 |
| JP | 2015-507801 A | 3/2015 |
| KR | 10-2005-0112540 A | 12/2005 |
| KR | 10-2011-0106702 A | 9/2011 |
| KR | 10-2012-0006254 A | 1/2012 |
| KR | 10-1414083 B1 | 7/2014 |
| KR | 10-2014-0112805 A | 9/2014 |
| KR | 10-2015-0007935 A | 1/2015 |

OTHER PUBLICATIONS

An Office Action; "Notice of Allowance," issued by the Korean Intellectual Property Office dated Mar. 10, 2017, which corresponds to Korean Patent Application No. 10-2015-0086748.

An Office Action mailed by the Korean Intellectual Property Office dated Apr. 23, 2018, which corresponds to Korean Patent Application No. 10-2017-0046533 and is related to U.S. Appl. No. 15/828,730; with English translation.

An Office Action mailed by the Japanese Patent Office dated Sep. 18, 2018, which corresponds to Japanese Patent Application No. 2017-563047 and is related to U.S. Appl. No. 15/828,730; with English translation.

An Office Action mailed by the Korean Intellectual Property Office dated Aug. 4, 2019, which corresponds to Korean Patent Application No. 10-2018-0013497 and is related to U.S. Appl. No. 15/828,730; with English translation.

An Office Action; "Notice of Reasons for Refusal," mailed by the Japanese Patent Office dated Apr. 14, 2020, which corresponds to Japanese Patent Application No. 2019-071361 and is related to U.S. Appl. No. 15/828,730; with English language Concise Explanation.

\* cited by examiner

WIRELESS LIGHTING CONTROL SYSTEM

CROSS-REFERENCE TO RELATED APPLICATIONS

The present application is a continuation of International Patent Application No. PCT/KR2016/006444, filed on Jun. 17, 2016, which is based upon and claims the benefit of priority to Korean Patent Application No. 10-2015-0086748, filed on Jun. 18, 2015. The disclosures of the above-listed applications are hereby incorporated by reference herein in their entirety.

BACKGROUND

Embodiments of the inventive concept described herein relate to wireless lighting control systems, and more particularly, relate to wireless lighting control systems capable of creating lighting patterns by remotely controlling a plurality of lighting devices, thereby increasing a lighting effect.

In general, lighting devices may achieve the purpose of lighting by reflecting, refracting, and transmitting light emitted from light sources. The lighting devices may be classified, according to light distribution, into an indirect lighting device, a semi-indirect lighting device, a general diffuse lighting device, a semi-direct lighting device, and a direct lighting device.

As technologies are developed, the lighting devices have been employed for various uses. For example, the lighting devices may be used to express Media Facade. The Media Facade refers to implementing a media function by m lighting devices on an outer wall of a building.

For another example, the lighting devices may be used as small cheering tools in sports matches, concerts, or the like which are held under an environment having specific illuminance or less. However, since a plurality of lighting devices are individually controlled under such an environment, systematical lighting patterns or lighting shapes may not be created. In addition, if only a light source provided in the lighting device is used, a desired cheering effect may not be produced.

SUMMARY

Embodiments of the inventive concept provide wireless lighting control systems capable of creating lighting patterns by remotely controlling a plurality of lighting devices, thereby improving a lighting effect.

According to an aspect of an embodiment, a wireless lighting control system includes a first smart device to receive information necessary for generating a lighting control signal, a first lighting device connected with the first smart device through a wired communication scheme or a wireless communication scheme to wirelessly transmit the lighting control signal, a second lighting device to receive the lighting control signal from the first lighting device and to control a lighting unit based on the received lighting control signal, and a second smart device connected with the second lighting device through a wired communication scheme or a wireless communication scheme to control a display unit based on the lighting control signal.

The lighting control signal includes lighting unit control information necessary for controlling the lighting unit of the second lighting device and display unit control information necessary for controlling the display unit of the second smart device.

The lighting unit control information includes at least one of a light color, a light brightness, a light-on time, a time interval for light blinking, and a light-off time, and the display unit control information includes at least one of a screen color, a screen brightness, a screen display start time, a time interval for screen blinking, a screen display termination time, and identification information of content to be displayed on a screen, which are to be expressed on the display unit.

The first smart device and the second smart device request the server to transmit data necessary for lighting control, when connected with the first lighting device and the second lighting device, respectively. The data include at least one of a lighting control application and content to be displayed on the display unit of the second smart device.

The lighting control application includes at least one of an icon corresponding to a preset lighting control pattern, an icon for inputting a lighting control execution instruction, an icon for terminating lighting control, and an icon for inputting an operation stand-by instruction.

As described above, the lighting patterns may be easily created by remotely controlling the lighting devices.

Since the lighting patterns may be created by utilizing the resources of the lighting device and the resources of the smart devices interworking with the lighting devices, the lighting effect may be increased due to the use of the lighting devices.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
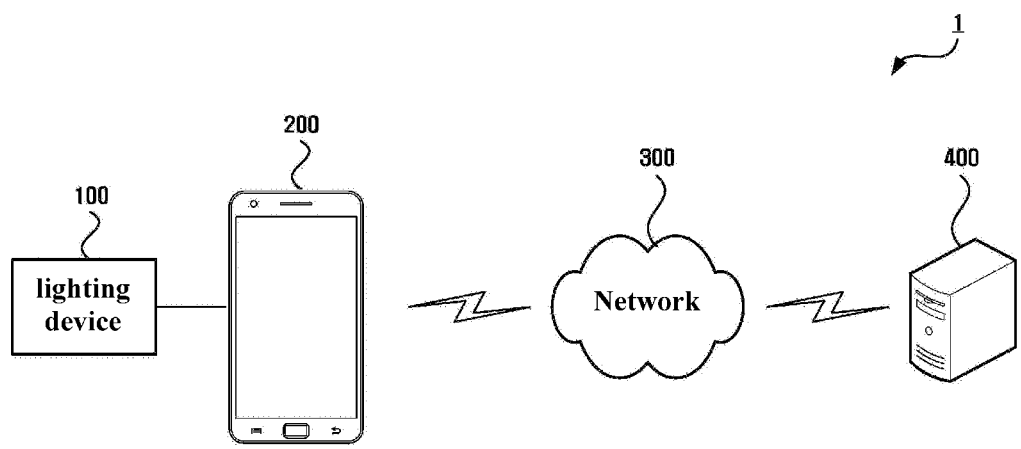
FIG. 1 is a view illustrating the configuration of a wireless lighting control system, according to an embodiment.

Advantage points and features of the prevent invention and a method of accomplishing thereof will become apparent from the following description with reference to accompanying drawings and embodiments to described in detail with reference to the accompanying drawings. However, the inventive concept may be embodied in various different forms, and should not be construed as being limited only to the illustrated embodiments. Rather, these embodiments are provided as examples so that this disclosure will be thorough and complete, and will fully convey the inventive concept to those skilled in the art. The inventive concept may be defined by scope of the claims.

Unless otherwise defined, all terms (including technical and scientific terms) used in this specification have the same meaning as commonly understood by those skilled in the art.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terms used in this specification are provided for the illustrative purpose, but the inventive concept is not limited thereto. As used in this specification, the singular terms are intended to include the plural forms as well, unless the context clearly indicates otherwise. Furthermore, it will be further understood that the terms "comprises", "comprising," "includes" and/or "including", when used herein, specify the presence of stated elements, steps, operations, and/or devices, but do not preclude the presence or addition of one or more other components, steps, operations and/or devices.

Hereinafter, embodiments of the inventive concept will be described with reference to accompanying drawings. The same reference numerals will be assigned to the same elements in drawings.

FIG. 1 is a view illustrating the configuration of a wireless lighting control system, according to an embodiment.

Referring to FIG. 1, a wireless lighting control system 1 according to an embodiment includes a lighting device 100, a smart device 200, a network 300, and a server 400.

The lighting device 100 may refer to an appliance to reflect, refract, or transmit light emitted from a light source and to fix or protect the light source. The lighting device 100 may have various shapes. For example, the lighting device 100 may have a rod shape enabling a user to hold the lighting device 100. For another example, the lighting device 100 may have a shape enabling the user to wear the lighting device 100 on part of a user body.

According to an embodiment, the lighting device 100 may detect the electrical connection with the smart device 200. After detecting the electrical connection with the smart device 200, the lighting device 100 transceives data and/or a signal with the smart device 200. For example, the lighting device 100 may transmit, to the smart device 200, a determination request signal for determining whether a lighting control application is installed in the smart device 200. For another example, the lighting device 100 may receive a lighting control signal from the smart device 200. The details of the configuration of the lighting device 100 will be described below with reference to FIG. 2.

The smart device 200 may be electrically connected with the lighting device 100. The smart device 200 electrically connected with the lighting device 100 transceives the data and/the signal with the lighting device 100. The smart device 200 receives, from the lighting device 100, the determination request signal for determining whether the lighting control application is installed therein, and transmits a lighting control signal to the lighting device 100.

The smart device 200 may communicate with the server 400 through the network 300. According to an embodiment, the smart device 200 transmits, to the server 400, an application request signal for requesting for the lighting control application or a content request signal for requesting for content and receives the lighting control application or the content from the server 400.

Meanwhile, if the lighting control application received from the server 400 has been completely installed, the smart device 200 transmits, to the lighting device 100, a signal for notifying that the lighting control application has been completely installed, and forms and displays a lighting control screen. If the lighting control screen is displayed, the user may input various instructions or information related to lighting control.

The above-described smart device 200 may include a communication device such as a smart phone or a tablet PC. However, the smart device 200 is not limited to the communication device. As long as the communication device has a wireless communication function and a display function, the communication device may be included the smart device 200. The details of the configuration of the smart device 200 will be described below with reference to FIG. 3.

The server 400 communicates with the lighting device 100 and the smart device 200 through the network 300. For example, the server 400 may receive the application request signal from the smart device 200 and then transmits the lighting control application to the smart device 200 in response to the application request signal. For another example, the server 400 may receive the content request signal from the smart device 200 and transmit the requested content to the smart device 200. For example, the content may include a text, an image, and a moving picture.

As described above, description has been made with reference to FIG. 1 regarding the configuration of the wireless lighting control system 1 according to an embodiment. With reference to FIG. 1, description has been made while focusing on the case that the lighting control application is distributed to the smart device 200 by the server 400. According to another embodiment, the lighting control application may be distributed to the smart device 200 by the lighting device 100.

Figure 2:
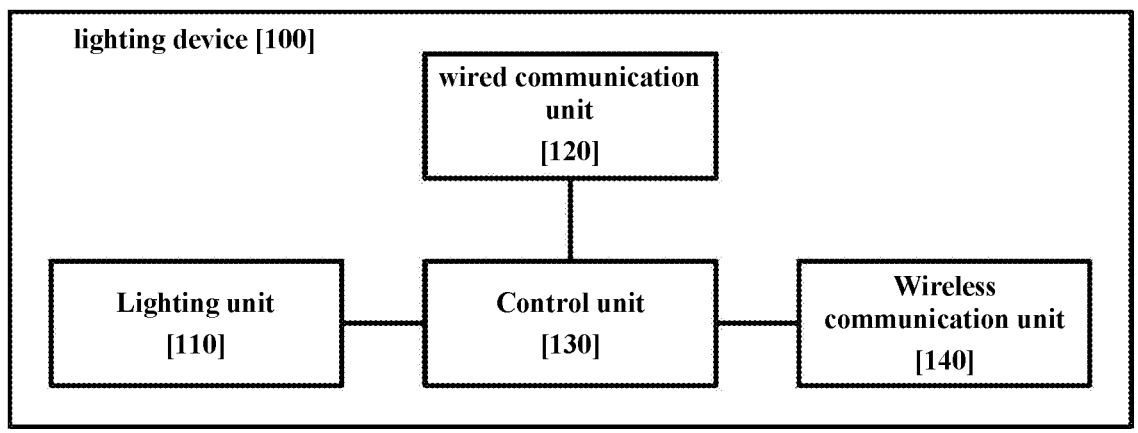
FIG. 2 is a block diagram illustrating the configuration of a lighting device illustrated in FIG. 1.

FIG. 2 is a block diagram illustrating the configuration of the lighting device 100 illustrated in FIG. 1.

Referring to FIG. 2, the lighting device 100 includes a lighting unit 110, a wired communication unit 120, a control unit 130, and a wireless communication unit 140.

The lighting unit 110 includes one or more light sources. For example, the light source may be a light emitting diode (LED). The lighting device 100 may include LEDs in mutually different colors. For example, the lighting device 100 may include at least one of a red LED, a green LED, a blue LED, and a white LED. If lights emitted from the LEDs are mixed, a wide color space may be produced. The mixed color is determined based on the ratio between the intensities of light emitted from each LED, and the intensity of the light emitted from the LED is proportional to a driving current of the LED. In addition, the color of light output from the lighting unit 110 may be controlled by controlling the driving current of each LED. A plurality of LEDs may be arranged in a dot shape. The LEDs are selectively turned on/off, thereby expressing a specific wording or a specific image.

Although the LED has been described as an example of a light source of the lighting device 100, the type of the light source is not limited to the LED. According to another embodiment, an organic light emitting diode (OLED) may be used as a light source.

The wired communication unit 120 may be in charge of wired communication between the lighting device 100 and the smart device 200. Although not illustrated in drawings, the wired communication unit 120 may include a wired communication port (for example, a universal serial bus (USB) port). The wired communication port provided in the wired communication unit 120 of the lighting device 100 may be electrically connected with a wired communication port provided in a wired communication unit 250 of the smart device 200. After the wired communication port of the lighting device 100 is engaged with the wired communication port of the smart device 200, a signal and/or data may be transceived between the lighting device 100 and the smart device 200. For example, the determination request signal for determining whether the lighting control application is installed may be transmitted to the smart device 200 and a response signal to the determination request signal is received from the smart device 200.

The wireless communication unit 140 is in charge of wireless communication between the lighting device 100 and another lighting device. To this end, the wireless communication unit 140 may support a wireless communication scheme. For example, the wireless communication scheme may include ZigBee.

The ZigBee is the standard for Wireless Personal Area Network (WPAN) which is a personal area network wirelessly enabling the access of peripheral devices operating at 868 MHz, 902-928 MHz, and 2.4 GHz. The ZigBee is based on IEEE 802.15 approved by IEEE-SA. When the ZigBee is used, peripheral devices having the distance of 50 m therebetween over the WPAN may transceive data therebetween at the maximum data rate of 250 Kbps.

Although the above description has been made in that the ZigBee is a wireless communication scheme supported by the wireless communication unit 140 for an illustrative purpose, the inventive concept is not limited thereto. The wireless communication unit 140 may further support at least one of wireless communication schemes other than the above communication scheme. For example, the wireless communication unit 140 may further support at least one of Bluetooth, Wireless broadband Internet (WiBro), Wi-Fi, an Ultra-Wide band (UWB), a Radio Frequency (RF), an Infrared Data Association (IrDA), and a Near Field Communication (NFC).

The wireless communication unit 140 may include one or more wireless communication chips to support one or more wireless communication schemes. For example, the wireless communication unit 140 may include a ZigBee chip and a Bluetooth chip. In this case, the ZigBee chip is in charge of wireless communication between the lighting device 100 and another lighting device. The Bluetooth chip is in charge of wireless communication between the lighting device 100 and the smart device 200. In other words, the Bluetooth chip of the wireless communication unit 140 may be substituted for wired communication between the lighting device 100 and the smart device 200.

The control unit 130 connects and controls elements of the lighting device 100. For example, the control unit 130 may detect the electrical connection state between the lighting device 100 and the smart device 200. If detecting the connection with the smart device 200, the control unit 130 transmits, to the smart device 200, the determination request signal for determining whether the lighting control application is installed.

In addition, the control unit 130 controls a lighting pattern based on the lighting control signal that is received. For example, the lighting control signal may include lighting unit control information and display unit control information. The control unit 130 controls the lighting pattern of the lighting unit 110 based on the lighting unit control information. The lighting unit control information may include a light color, a light brightness, a light-on time, a light-off time, and a light blinking rate. As described above, the lighting unit control information may be previously defined or may be personally set by a user.

As described above, the configuration of the lighting device 100 illustrated in FIG. 1 has been described with reference to FIG. 2. As illustrated in FIG. 2, a power unit may be omitted from the lighting device 100. In this case, the lighting device 100 operates by receiving power from the smart device 200 after electrically connected with the smart device 200. For another example, a power unit (battery) may be further provided in the lighting device 100. The power unit may be separated from the lighting device 100 and replaced with another power unit or may be charged with external power.

Figure 3:
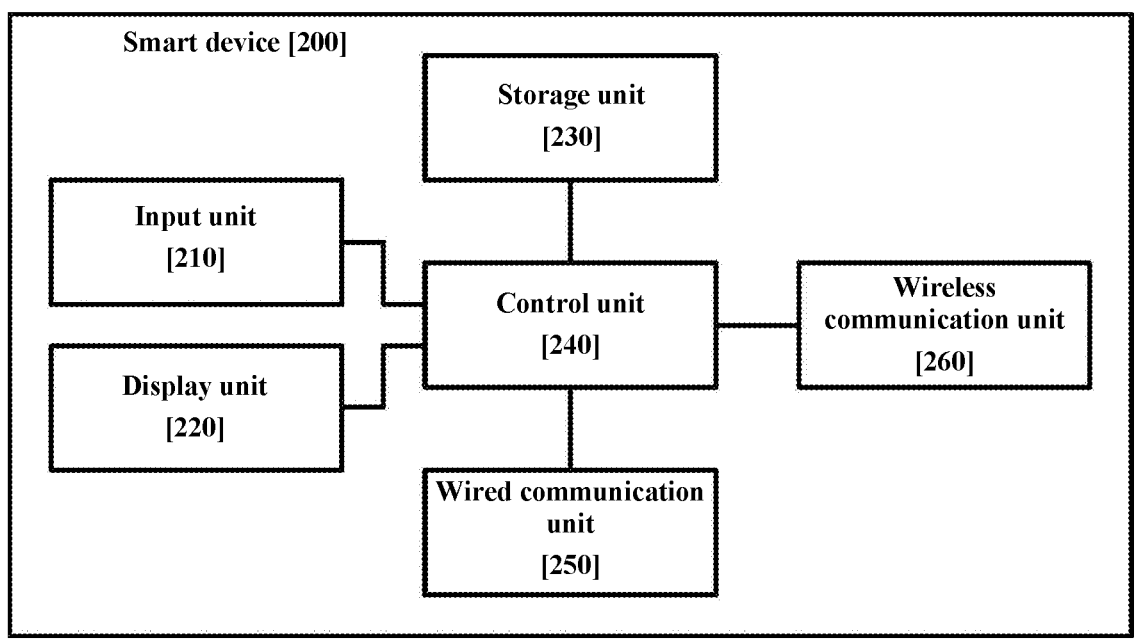
FIG. 3 is a block diagram illustrating the configuration of a smart device illustrated in FIG. 1.

FIG. 3 is a block diagram illustrating the configuration of the smart device illustrated in FIG. 1.

Referring to FIG. 3, the smart device 200 includes an input unit 210, a display unit 220, a storage unit 230, a control unit 240, and the wired communication unit 250, and a wireless communication unit 260.

The input unit 210 receives various pieces of information and/or various instructions from a user. For example, the input unit 210 may receive a lighting pattern selection instruction for selecting the lighting pattern, an operation stand-by instruction, a lighting control execution instruction for starting the lighting control, and a lighting control termination instruction for terminating the lighting control under execution. To this end, the input unit 210 may include at least one of a joystick, a mouse, a keypad, and a keyboard. In this case, the keyboard may be implemented in hardware or in software.

When the lighting control application is run, the display unit 220 may display a lighting control screen. According to an embodiment, the lighting control screen may have various pieces of information and/or various icons may be arranged thereon. For example, the lighting control screen may have icons corresponding to preset lighting control patterns, an icon for inputting the lighting control execution instruction, and an icon for terminating the lighting control, which are arranged on the lighting control screen. However, icons arranged on the lighting control screen are not limited to the above icons. The lighting control screen may be implemented such that the types and the arrangement positions of icons included in the lighting control screen are set by a user.

If the lighting control execution instruction is input after a specific lighting pattern is selected from among the preset lighting patterns or a specific lighting pattern is set, a lighting control signal corresponding to the lighting pattern is created. In this case, the display unit 220 is controlled based on the lighting control signal. In detail, the lighting control signal may include the lighting unit control information and the display unit control information. The display unit 220 may be controlled based on the display unit control information of the lighting control signal. For example, the display unit control information may include a screen color, a screen brightness, a screen display start time, a time interval for screen blinking, a screen display termination time, and identification information of content to be displayed on the screen.

The storage unit 230 may include a hard disk drive (HDD), an optical disk drive, a magneto-optical (MO) disk drive, a nonvolatile memory, a volatile memory, or the combination thereof. The storage unit 230 stores data necessary when the smart device 200 operates. For example, the storage unit 230 may store the lighting control application. The lighting control application is to control at least one of the display unit 220 of the smart device 200 and the lighting unit 110 of the lighting device 100. The lighting control application may be implemented in the form of a mobile application and may be distributed by the server 400 through the network 300.

The wired communication unit 250 may be in charge of wired communication between the lighting device 200 and the smart device 100. Although not illustrated in drawings, the wired communication unit 250 may include a wired communication port. The wired communication port provided in the wired communication unit 250 of the smart device 200 may be electrically connected with the wired communication port provided in the wired communication unit 120 of the lighting device 100. If the wired communication port of the smart device 200 is engaged with the wired communication port of the lighting device 100, a signal and/or data may be transceived between the smart device 200 and the lighting device 100. For example, the determination request signal for determining whether the lighting control application is installed may be received from the lighting device 100 and a response signal to the determination request signal is received from the lighting device 100.

The wireless communication unit 260 is in charge of wireless communication between the smart device 200 and the lighting device 100 and/or between the smart device 200 and the server 400. To this end, the wireless communication unit 260 may support a wireless communication scheme. For example, the wireless communication scheme may include UWB, WiFi, Bluetooth, ZigBee, RF, and IrDA, and the inventive concept is not limited thereto.

The control unit 240 connects elements, which are provided in the smart device 200, with each other and controls the elements. For example, if the determination request signal for determining whether the lighting control application is installed is received from the lighting device 100, the control unit 240 may determine whether the smart device 200 has the lighting control application installed therein. If the lighting control application is not installed in the smart device 200 according to the determination result, the control unit 240 transmits the application request signal to the server 400. Thereafter, if receiving a lighting control application from the server 400, the control unit 240 installs the received lighting control application.

If the lighting control application is executed after completely installed, the control unit 240 may form a lighting control screen. The lighting control screen may contain icons corresponding to preset lighting control patterns, an icon for inputting a lighting control execution instruction, an icon for terminating lighting control, and an icon for inputting an operation stand-by instruction. The user may select a specific lighting pattern from the lighting control screen or may input information or data necessary for lighting control. Thereafter, if the lighting control execution instruction is input, the control unit 240 generates a lighting control signal corresponding to the selected lighting pattern. The generated lighting control signal is used to control the display unit 220 of the smart device 200 and the lighting unit 110 of the lighting device 100.

As described above, description has been made with reference to FIGS. 1 to 3 regarding the configuration of the wireless lighting control system 1 according to an embodiment.

Although FIG. 1 illustrates one lighting device 100 and one smart device 200, a plurality of lighting devices 100 and a plurality of smart devices 200 may be provided. In this case, the lighting devices 100 may include a first lighting device (see reference numeral 100A of FIG. 4) and second lighting devices (see reference numerals 100B, 100C, and 100D). The smart devices 200 may include a first smart device (see reference numeral 200A of FIG. 4) and second smart devices (see reference numerals 200B, 200C, and 200D of FIG. 4).

The first lighting device 100A may be connected with the first smart device 200A through a wired communication scheme or a wireless communication scheme. The first lighting device 100A may act as a master. The second lighting devices 100B, 100C, and 100D may be connected with the second smart devices 200B, 200C, and 200D, respectively, through a wired communication scheme or a wireless communication scheme. The second lighting devices 100B, 100C, and 100D may act as slaves. The first lighting device 100A acting as the master may transmit operation stand-by signals and lighting control signals to the second lighting devices 100B, 100C, and 100D. The details thereof will be described in more detail with reference to FIGS. 4 and 5.

Figure 4:
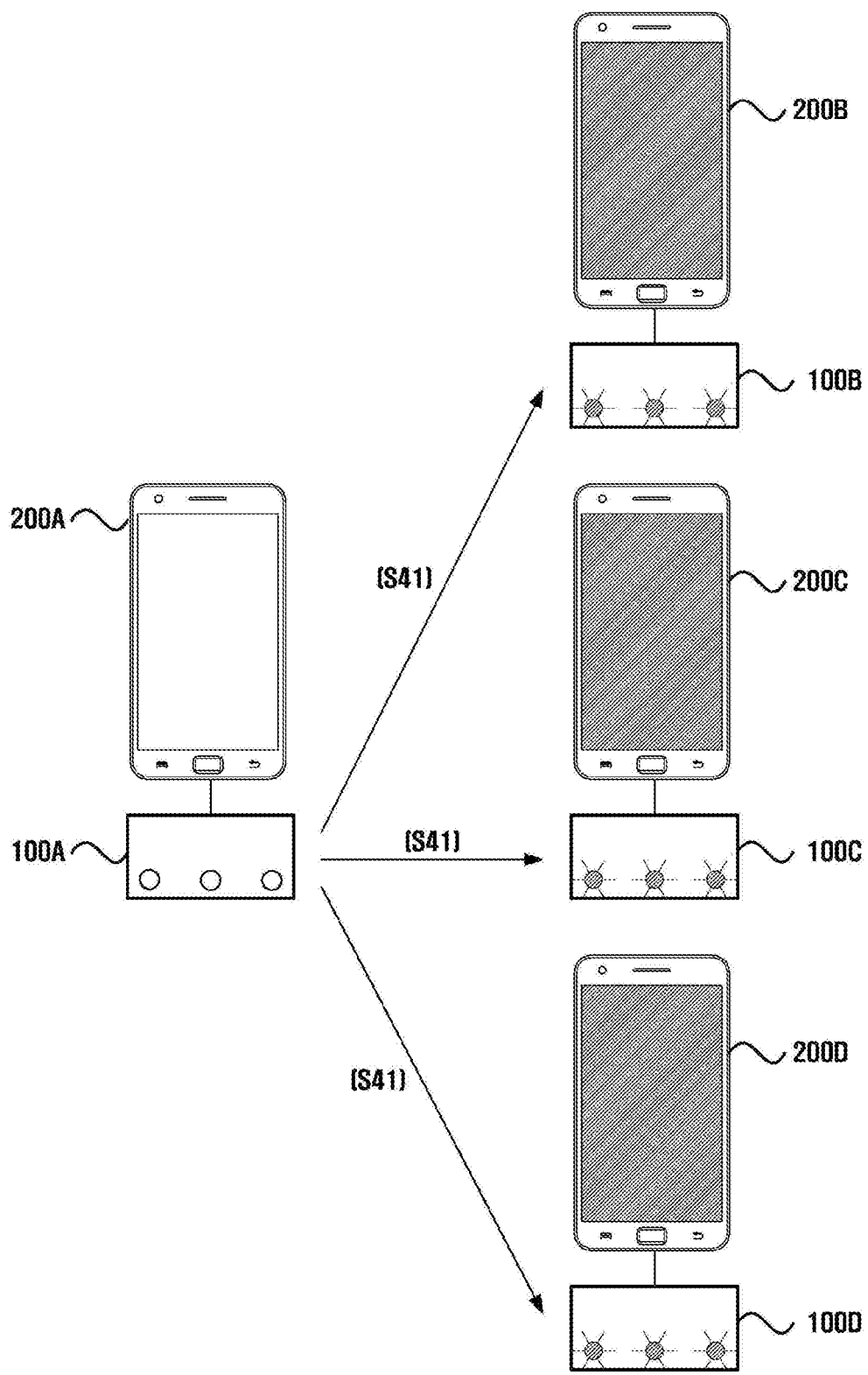
FIG. 4 is a view illustrating an operation of a wireless lighting control system including a plurality of lighting devices and a plurality of smart devices, according to an embodiment.

FIG. 4 is a view illustrating the operation of a wireless lighting control system including the lighting devices 100A, 100B, 100C, and 100D and the smart devices 200A, 200B, 200C, and 200D, according to an embodiment.

Before the description of the operation of the wireless lighting control system, it is assumed that the first lighting device 100A acting as the master and the second lighting devices 100B, 100C, and 100D acting as slaves are positioned within a radio control range by the first lighting device 100A.

First, the first lighting device 100A detects the connection with the first smart device 200A. First, the first lighting device 100A detects wired connection or wireless connection with the first smart device 200A. Thereafter, the first lighting device 100A transmits, to the first smart device 200A, a determination request signal for determining whether a lighting control application is installed.

The first smart device 200A determines whether to have the lighting control application installed therein. If the lighting control application is not installed, the first smart device 200A transmits, to the server 400, an application request signal for requesting for the lighting control application.

The server 400 transmits the lighting control application, which has been requested, to the first smart device 200A through the network 300.

If the lighting control application is installed in the first smart device 200A and executed, a lighting control screen is formed. According to the embodiment, the lighting control screen may have icons corresponding to preset lighting control patterns, an icon for inputting a lighting control execution instruction, an icon for terminating lighting control, and an icon for inputting an operation stand-by instruction. The lighting control screen is displayed through the display unit 220 of the first smart device 200A.

Thereafter, if a user inputs the operation stand-by instruction through the lighting control screen, the input operation stand-by instruction is transmitted to the first lighting device 100A through the wired communication unit 250. The first lighting device 100A transmits the operation stand-by instruction, which is received from the first smart device 200A, to the second lighting devices 100B, 100C, and 100D through a wireless communication scheme.

The second lighting devices 100B, 100C, and 100D control lighting units 110 based on the operation stand-by instruction received from the first lighting device 100A to notify users of the reception of the operation stand-by instruction. For example, the second lighting devices 100B, 100C, and 100D may blink the lighting units 110 at regular intervals for a specific time, thereby notifying the users having the second lighting devices 100B, 100C, and 100D of the reception of the operation stand-by instruction.

The users having received the operation stand-by instruction connect the second lighting devices 100B, 100C, and 100D with the second smart devices 200B, 200C, and 200D, respectively. Accordingly, the second lighting devices 100B, 100C, and 100D detect the connection with the second smart devices 200B, 200C, and 200D. In other words, the second lighting devices 100B, 100C, and 100D detect the wired or wireless connection with the second smart devices 200B, 200C, and 200D.

If detecting the connection with the second smart devices 200B, 200C, and 200D, the second lighting devices 100B, 100C, and 100D transmit, to the second smart devices 200B, 200C, and 200D, determination request signals for determining whether lighting control applications are installed.

If the lighting control applications are not installed or the update of the lighting control applications are necessary according to the determination result of the installation states of the lighting control applications, the second smart devices 200B, 200C, and 200D transmit, to the server 400, application request signals for requesting for the lighting control applications or update request signals for requesting for the update of the lighting control applications.

The server 400 transmits the lighting control applications, which are requested, to the second smart devices 200B, 200C, and 200D through the network 300. Thereafter, the server 400 may transmit, to the first smart device 200A, a signal for notifying that the lighting control applications have been transmitted to the second smart devices 200B, 200C, and 200D.

Thereafter, if the user of the first smart device 200A inputs a lighting control execution instruction after selecting a specific lighting pattern from among lighting patterns displayed on the lighting control screen or setting the lighting pattern, the first smart device 200A generates a lighting control signal corresponding to the selected or set lighting pattern. The generated lighting control signal is transmitted to the second lighting devices 100B, 100C, and 100D through the first lighting device 100A (S41).

The second lighting devices 100B, 100C, and 100D transmit the received lighting control signal to the second smart devices 200B, 200C, and 200D, respectively. Accordingly, the lighting units 110 of the second lighting devices 100B, 100C, and 100D and the display units 220 of the second smart devices 200B, 200C, and 200D are controlled based on the lighting control signal. For example, if the light color of the lighting unit control information contained in the lighting control signal is set to a red color and the screen color of the display unit control information contained in the lighting control signal is set to a red color, red colors may be output from the lighting units 110 of the second lighting devices 100B, 100C, and 100D (expressed as shadow in FIG. 4) and red screens may be displayed on the display units 220 of the second smart devices 200B, 200C, and 200D (expressed as shadow in FIG. 4).

According to the above method, the lighting units 110 of the second lighting devices 100B, 100C, and 100D and the display units 220 of the second smart devices 200B, 200C, and 200D are simultaneously controlled. As compared to the case of controlling only the lighting units 110 of the second lighting devices 100B, 100C, and 100D, the visual cheering effect may be increased.

Figure 5:
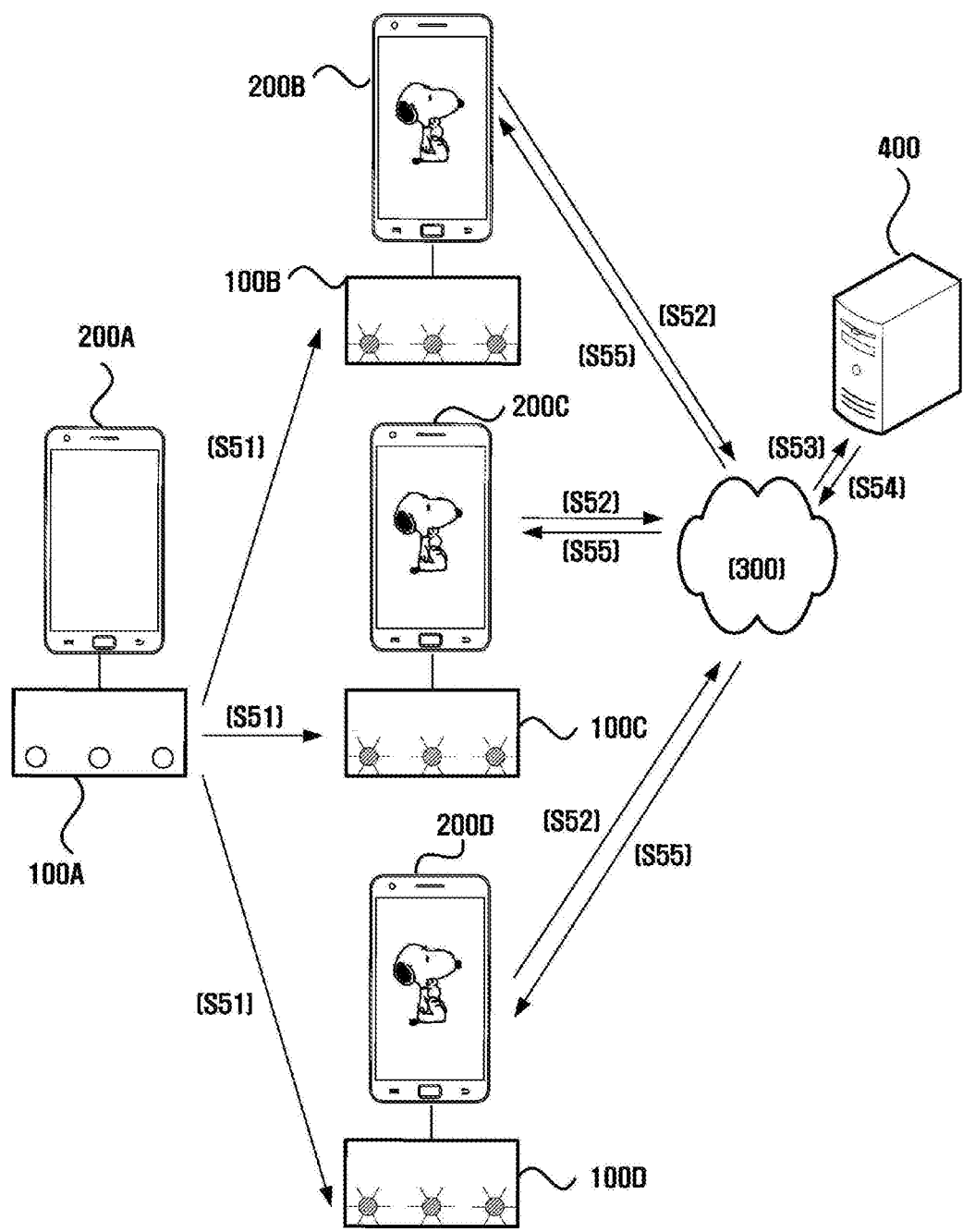
FIG. 5 is a view illustrating an operation of a wireless lighting control system including a plurality of lighting devices and a plurality of smart devices, according to another embodiment.

FIG. 5 is a view illustrating the operation of the wireless lighting control system including the lighting devices 100A, 100B, 100C, and 100D and the smart devices 200A, 200B, 200C, and 200D, according to an embodiment.

Before the description of the operation of the wireless lighting control system, it is assumed that the first lighting device 100A acting as the master and the second lighting devices 100B, 100C, and 100D acting as slaves are positioned within a radio control range by the first lighting device 100A.

In addition, it is assumed that the first lighting device 100A is in the connection state with the first smart device 200A through a wired communication scheme or a wireless communication scheme, and the second lighting devices 100B, 100C, and 100D are in the connection states with the second smart devices 200B, 200C, and 200D, respectively, through a wired communication scheme or a wireless communication scheme. Further, it is assumed that the first smart device 200A and the second smart devices 200B, 200C, and 200D have lighting control applications installed therein.

In this state, if the lighting control application of the first smart device 200A is executed, the lighting control screen is formed, and the formed lighting control screen is displayed on the display unit 220 of the first smart device 200A. The lighting control screen may include an input window or an input icon for receiving the input of information (hereinafter, referred to as "lighting unit control information) necessary for controlling the lighting units 110 of the second smart devices 200B, 200C, and 200D and information (hereinafter, referred to as "display unit control information") necessary for controlling the display units 220 of the second smart devices 200B, 200C, and 200D.

For example, the lighting unit control information may include a light color, a light brightness, a lighting start time, a time interval for light blinking, and a lighting termination time. For example, the display unit control information may include a screen color, a screen brightness, a screen display start time, a time interval for screen blinking, a screen display termination time, and identification information of content to be displayed on the screen, which are to be displayed on the display unit 220.

If the lighting control execution instruction is input after the lighting unit control information and the display unit control information are input as described above, the first smart device 200A generates a lighting control signal containing the input information. The generated lighting control signal is transmitted to the second lighting devices 100B, 100C, and 100D through the first lighting device 100A (SM).

The second lighting devices 100B, 100C, and 100D transmit the received lighting control signal, which is received from the first lighting device 100A, to the second smart devices 200B, 200C, and 200D, respectively.

The second smart devices 200B, 200C, and 200D recognize the display unit control information contained in the lighting control signal and determine whether the communication with the server 400 is necessary. For example, if content identification information is contained in the display unit control information, the second smart devices 200B, 200C, and 200D may transmit relevant content request signals (S52 and S53).

The server 400 transmits requested contents (for example, images or moving pictures) to the second smart devices 200B, 200C, and 200D through the network 300 (S54 and S55).

If the requested contents (for example, the images or the moving pictures) are received from the server 400, the second smart devices 200B, 200C, and 200D display the received contents on the relevant display units 220. In this case, content may be displayed based on the display unit control information contained in the lighting control signal. In detail, the content may be displayed based on the screen display start time, the time interval for the screen blinking, the screen display termination time, and the screen brightness. For example, if the content received from the server 400 is an image of "Snoopy", the image of "Snoopy" may be displayed on the display units 220 of the second smart devices 200B, 200C, and 200D based on the screen display start time, the time interval for the screen blinking, the screen display termination time, and the screen brightness which are contained in the display unit control information.

Simultaneously, the second lighting devices 100B, 100C, and 100D control the lighting units 110. In this case, the lighting units 110 of the second lighting devices 100B, 100C, and 100D may be controlled based on the lighting unit control information contained in the lighting control signal. In detail, the lighting units 110 may be controlled based on a light color, a light brightness, a lighting start time, a time interval for light blinking, and a lighting termination time which are contained in the lighting unit control information. For example, if the light color of the lighting unit control information is set to a red color, red lights may be output from the lighting units 110 of the second lighting devices 100B, 100C, and 100D (expressed as shadow in FIG. 5), based on the light brightness, the lighting start time, the time interval for light blinking, and the lighting termination time which are contained in the lighting unit control information.

According to the above method, the lighting units 110 of the second lighting devices 100B, 100C, and 100D and the display units 220 of the second smart devices 200B, 200C, and 200D are simultaneously controlled. Accordingly, as compared to the case of controlling only the lighting units 110 of the second lighting devices 100B, 100C, and 100D, the visual cheering effect may be increased. In addition, since various contents, such as a text, an image, and a moving picture, may be integrally displayed through the second smart devices 200B, 200C, and 200D, visual cheering effects may be produced in various manners.

As described above, the wireless lighting control system and the operation thereof according to an embodiment of the inventive concept have been described with reference to FIGS. 1 to 5. The above description has been made with reference to FIGS. 1 to 5 regarding the case that the lighting control signal generated from the first smart device 200A is transmitted to the second lighting devices 100B, 100C, and 100D through the first lighting device 100A. According to another embodiment, the lighting control signal generated from the first smart device 200A may be transmitted to the second lighting devices 100B, 100C, and 100D through the second smart devices 200B, 200C, and 200D, respectively.

In addition, the above description has been made with reference to FIGS. 1 to 5 regarding the case that the lighting units 110 of the second lighting devices 100B, 100C, and 100D and the display units 220 of the second smart devices 200B, 200C, and 200D are controlled based on the lighting control signal generated from the first smart device 200A. According to another embodiment, the lighting unit 110 of the first lighting device 100A and the display unit 220 of the first smart device 200A may be controlled based on the lighting control signal generated from the first smart device 200A.

As described above, description has been made regarding embodiments of the inventive concept. Embodiments of the inventive concept may be realized with a medium, such as a computer-readable medium, including a computer-readable code/command for controlling at least one processing element of the above-described embodiments. The medium may correspond to a medium/media enabling the storage and/or the transfer of the computer-readable code.

The computer-readable code may be not only recorded in a medium, but also transferred through the Internet. The medium may include, for example, a recording medium, such as a magnetic storage medium (for example, a read only memory (ROM), a floppy disk, a hard disk, or the like) and an optical recording medium (for example, a CD-ROM, a Blu-Ray, a DVD, or the like) and a transfer medium such as a carrier wave. Since the media may be provided in the form of a distributed network, the computer-readable code may be stored/transferred and executed in a distributed manner. Further, as one example, processing elements may include a processor or a computer processor and may be distributed and/or included in one device.

Although embodiments of the inventive concept have been described with reference to accompanying drawings, those skilled in the art should understand that various modifications are possible without departing from the technical scope of the inventive concept or without changing the technical sprite or the subject matter of the inventive concept. Therefore, those skilled in the art should understand that the technical embodiments are provided for the illustrative purpose in all aspects and the inventive concept is not limited thereto.

What is claimed is:

1. A wireless lighting control system comprising:
a first device configured to generate a lighting control signal based on preset lighting control patterns;
a first lighting device connected with the first device, and configured to act as a master device to control a plurality of second lighting devices, and to wirelessly transmit the generated lighting control signal to the plurality of second lighting devices;
the plurality of second lighting devices each of which is configured to act as a cheering lighting device, to receive the lighting control signal from the first lighting device, and to control a lighting pattern of a respective lighting unit based on the received lighting control signal; and
a plurality of second devices each of which is connected with a respective second lighting device, and configured to transmit and receive signals to and from the first device, and to control a respective display unit according to the lighting control signal received from the first device,
wherein the plurality of second lighting devices and the plurality of second devices are simultaneously controlled according to the lighting control signal generated by the first device,
wherein the plurality of second lighting devices include one or more sub-groups including second lighting devices, and the plurality of second devices include one or more sub-groups including second devices,
wherein, when the one sub-group including second lighting devices and the one sub-group including second devices are connected with each other, the one sub-group including second lighting devices and the one sub-group including second devices are simultaneously controlled according to a sub-group lighting control signal directed to the one sub-group including second lighting devices and the one sub-group including second devices, and integrally display one visual cheering representation corresponding to the preset lighting patterns over lighting patterns of lighting units of the one sub-group including second lighting devices and display units of the one sub-group including second devices, wherein the first device is configured to generate the lighting control signal that includes first information necessary for controlling lighting patterns of the lighting units of the plurality of second lighting devices based on the preset lighting control patterns, and second information necessary for controlling the display units of the plurality of second devices connected with the lighting units of the plurality of second lighting devices, and wherein the first lighting device is configured to transmit the lighting control signal that includes the first information and the second information to the plurality of second lighting devices for simultaneously controlling the lighting units of the plurality of second lighting devices and the display units of the plurality of second devices connected with the plurality of second lighting devices.

2. The wireless lighting control system of claim 1, wherein the first information includes at least one of a light color, a light brightness, a light-on time, a time interval for light blinking, and a light-off time, of the lighting units of the plurality of second lighting devices, and wherein the second information includes at least one of a screen color, a screen brightness, a screen display start time, a time interval for screen blinking, a screen display termination time, and identification information of content to be displayed on a screen, which are to be expressed on the display units of the plurality of second devices.

3. The wireless lighting control system of claim 1, wherein the plurality of second devices are configured to request a server to transmit data necessary for a lighting control when the plurality of second devices are connected with the plurality of second lighting devices and the server, and wherein the data include at least one of a lighting control application and a content to be displayed on the display units of the plurality of second devices.

4. The wireless lighting control system of claim 3, wherein the lighting control application includes at least one of an icon corresponding to a preset lighting control pattern, an icon for inputting a lighting control execution instruction, an icon for terminating lighting control, and an icon for inputting an operation stand-by instruction.

5. The wireless lighting control system of claim 1, wherein, when the plurality of second lighting devices detect connections with the plurality of second devices, the plurality of second devices install lighting control applications in response to request signals for installation of the lighting control applications, and wherein, when the lighting control applications are installed and executed in the plurality of second devices, the plurality of second lighting devices receive, via the lighting control applications, information necessary for controlling the lighting patterns of lighting units of the plurality of second lighting devices, generated based on the preset lighting patterns.

6. The wireless lighting control system of claim 1, wherein the lighting units of the plurality of second lighting devices and the display units of the plurality of second devices are configured to be simultaneously controlled by the lighting control signal transmitted from the first lighting device.

7. The wireless lighting control system of claim 1, the lighting control signal is configured to be generated by the first device, and transmitted from the first device to the first lighting device, the plurality of second lighting devices, and the plurality of second devices in order.

* * * * *